C. A. ROGERS.
AUTOMOBILE FENDER.
APPLICATION FILED JAN. 22, 1916.
1,188,325.
Patented June 20, 1916.
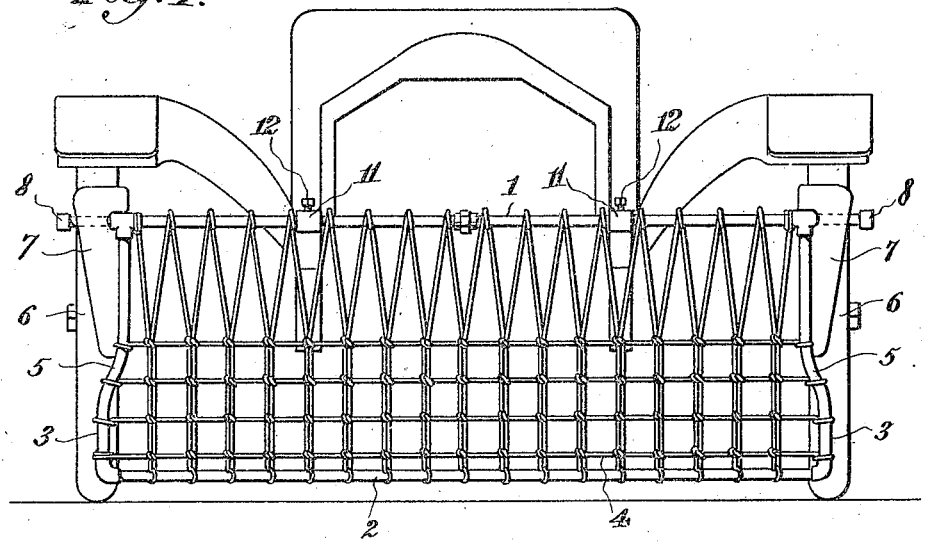
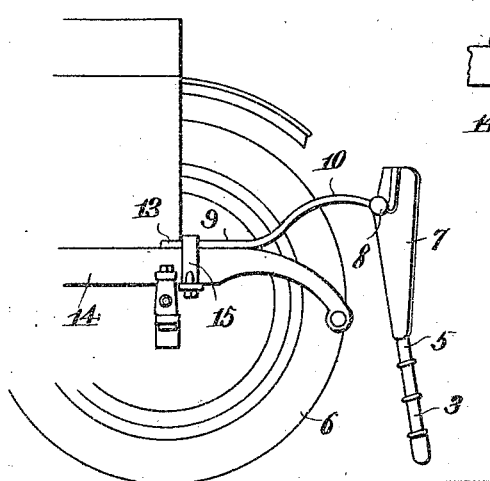
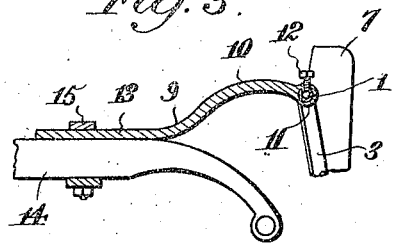
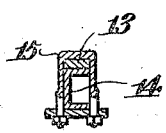
Inventor,
Charles A. Rogers
By Victor J. Evans,
Attorney.
Witnesses:

UNITED STATES PATENT OFFICE.

CHARLES A. ROGERS, OF ATLANTIC CITY, NEW JERSEY, ASSIGNOR OF ONE-HALF TO WILLIAM L. CROOK, OF ATLANTIC CITY, NEW JERSEY.

AUTOMOBILE-FENDER.

1,188,325.  Specification of Letters Patent.  Patented June 20, 1916.

Application filed January 22, 1916. Serial No. 73,699.

*To all whom it may concern:*

Be it known that I, CHARLES A. ROGERS, a citizen of the United States, residing at 2524 Arctic avenue, Atlantic City, in the county of Atlantic and State of New Jersey, have invented new and useful Improvements in Automobile-Fenders, of which the following is a specification.

This invention relates to fenders for automobiles and other motor vehicles, the object in view being to provide a safety fender particularly designed for use upon an automobile or like vehicle to prevent persons from being struck by the frame, radiator, mud guards, and other parts of the machine including the front wheels, combined with means whereby the main body of the fender may be adjusted to give any desired amount of road clearance below the bottom of the fender body.

A further object of the invention is to provide resilient supporting means for the fender body which will serve to cushion the shock or impact when the fender comes in contact with a person thereby adding to the safety of the fender as a whole.

Another object in view is to produce a fender which while reliable and practical for the purpose intended, is also attractive in appearance and capable of being produced and maintained at a minimum cost.

With the above and other objects in view, the invention consists in the novel construction, combination, and arrangement, herein fully described, illustrated, and claimed.

In the accompanying drawings: Figure 1 is a front elevation illustrating the fender of this invention as applied to an automobile. Fig. 2 is a side elevation of the same. Fig. 3 is a vertical section taken adjacent to one of the resilient supporting arms which is shown in longitudinal section. Fig. 4 is a fragmentary vertical cross section through one of the frame bars of the vehicle showing means for detachably fastening the fender in place on the machine.

The main body of the fender comprises a top horizontal bar 1, a bottom horizontal bar 2, and upright end bars 3 fixedly secured at their upper and lower extremities to the top and bottom horizontal bars 1 and 2 thereby forming a substantially quadrilateral open center frame or stretcher upon which is strung a network 4 preferably composed of small rope or stout cords which are drawn taut or otherwise fastened together at the crossing or intersecting points, thus forming what may be called a coarse meshed fabric.

The end bars 3 are offset between the upper end lower extremities thereof as shown at 5 so that while the upper extremities thereof are preferably located within the plane of the front wheels 6 of the vehicle, the lower end portions of the end bars extend in advance of the front wheels in order to prevent the wheels from running over a person should he be knocked down by the fender. Extending upwardly from the offsets 5 of the end bars 3 are flexible guards 7 preferably of sheet metal of the desired gage or thickness, said guards 7 tapering from end to end and being of considerably greater width at the top than at the bottom. Furthermore the guards 7, which are fastened along their inner vertical edges to the end uprights or bars 3 extend above the top cross bar 1 while the latter is extended outside of or beyond the end bars 3 to form stops 8 against which the guards 7 strike and by means of which said guards are supported when they are subjected to violent impacts. The guards 7 serve to prevent a person or the arms or legs of said person from coming into contact with the front wheels of the machine and in that way add to the safety and practical value of the fender.

The supporting means for the fender consists of a pair of resilient arms 9 which are preferably bowed in an upward direction as at 10 and provided at their forward extremity with knuckles or eyes 11 to receive the top bar 1 of the fender which bar passes through said eyes or knuckles and is held by means of set screws 12 which permit the top bar to be moved longitudinally in order to center the fender or set the same to one side or the other of the center if required, the same means providing for the adjustment of the inclination of the fender from top to bottom, enabling the bottom bar of the fender to be set further forward or backward, and also to enable the road clearance below the bottom fender bar 2 to be varied in accordance with the condition of the road surface upon which the machine is traveling.

The rear end portions of the resilient fender-supporting arms are substantially straight, as shown at 13, adapting them to rest upon the upper side of the side bars 14 of the frame of the vehicle where they are held in fixed relation to the bars 14 by means of clips 15 resembling the ordinary axle clips.

The fender herein above described and illustrated in the accompanying drawings is extremely simple, is of light weight, attractive in appearance, extends entirely across the machine, and may be economically manufactured out of gas pipe or stock tubing with suitable unions and elbows as indicated in the drawings, and the fender as a whole is capable of being applied to and mounted upon any machine now on the market without in any way altering any part of the machine, the fender being held in place only by a pair of axle clips which thus render the fender easily and quickly detachable.

I claim:

The combination with a motor vehicle, of a fender body comprising a top horizontal bar, a bottom horizontal bar, end bars connecting said top and bottom bars and offset between their ends so as to extend outwardly in opposite directions in front of the steering wheels of the machine, the top bar of the fender body being extended at its opposite ends beyond the end bars to form stops, flexible guards secured along their inner edges to said end bars, gradually increasing in width toward their upper ends and extending above the stops formed by the extended extremities of the top bar, resilient supporting arms provided with knuckles through which the top bar of the fender body passes, said screws passing through said knuckles and providing for longitudinal and axial adjustment of said top bar, and means detachably fastening said resilient supporting arms to the side bars of the vehicle frame.

In testimony whereof I affix my signature in presence of two witnesses.

CHARLES A. ROGERS.

Witnesses:
 JOHN J. BARRETT,
 WM. H. AIKIN.